United States Patent
Bolt et al.

[15] 3,640,726
[45] Feb. 8, 1972

[54] FLAVOR ROBUSTA COFFEE

[72] Inventors: Gregory L. Bolt, Springfield Township, Hamilton County; Charles H. Brandt, Cincinnati; Aubrey R. McLain, Wyoming; Jayantilal M. Patel, Reading, all of Ohio

[73] Assignee: The Procter & Gamble Company, Cincinnati, Ohio

[22] Filed: Nov. 25, 1970

[21] Appl. No.: 92,880

Related U.S. Application Data

[63] Continuation of Ser. No. 762,157, Sept. 24, 1968, abandoned.

[52] U.S. Cl. .................................................99/68
[51] Int. Cl. ............................................A23f 1/02
[58] Field of Search ..................................99/68, 65

[56] References Cited

UNITED STATES PATENTS

| | | | |
|---|---|---|---|
| 2,712,501 | 7/1955 | Hale et al. | 99/68 X |
| 3,088,825 | 5/1963 | Topalian et al. | 99/68 |
| 3,106,470 | 10/1963 | Spotholz | 99/68 |
| 3,399,998 | 9/1968 | Morrison | 99/68 |

OTHER PUBLICATIONS

Sivets & Foote, Coffee Processing Technology Vol. I, 1963, pp 202–239

*Primary Examiner*—Frank W. Lutter
*Assistant Examiner*—William L. Mentlik
*Attorney*—Richard C. Witte

[57] ABSTRACT

Improved flavor Robusta coffee for use in a roast and ground coffee blend is produced by separately steam roasting, then postroasting Robusta coffee beans under particular conditions.

10 Claims, No Drawings

FLAVOR ROBUSTA COFFEE

This is a streamlined continuation of application Ser. No. 762,157, filed Sept. 24, 1968 and now abandoned.

BACKGROUND OF THE INVENTION

The field of this invention is roast and ground coffee. More particularly, this invention relates to specially processed Robusta coffee, to a blend containing this coffee, and to a novel roasting method for producing this coffee.

Roast and ground coffee products are usually produced by blending together various types of coffee beans, roasting the beans, and grinding the roasted beans. This invention particularly relates to the blending and roasting operations.

In a conventional blending operation, there are three major types of coffee beans which are blended together to formulate a roast and ground coffee product. These three types of coffee beans are milds, Brazilians, and Robustas. Botanically, the milds and Brazilians are denoted Arabicas.

The milds give coffee brews which are fragrant, acid, and usually heavy bodied. The Brazilian beans result in coffee brews which are relatively nonaromatic and neutral flavored. The Robusta beans produce brews with strong distinctive flavor characteristics in that these brews are characteristically bitter and possess varying degrees of a rubbery flavor note.

Traditionally, the milds are the most expensive of the three types of beans, with Brazilians being of intermediate expense, and Robustas being least expensive.

While many coffee blends utilize a minor portion of Robustas to contribute desirable flavor notes, in the United States and in certain other countries the level of Robusta usage ordinarily must be very limited in spite of their traditionally low cost. This is because in these countries the exceptionally strong characteristic flavor of Robusta brews is not very acceptable to consumers. Thus, in the United States the level of Robusta usage is often limited to a maximum of about 20 percent by weight of a blend since levels of usage higher than this noticeably impair the taste expected for roast and ground coffee brews in this country. On the other hand, variations in the levels of usage of Brazilians and milds in a blend can be made with relatively greater freedom without adverse effect.

Thus, it would be desirable to be able to formulate blends of roast and ground coffees with greater latitude than that conventionally permitted without changing the taste characteristics of coffee brews prepared therefrom. In particular it would be especially desirable to be able to use more Robusta beans in a roast and ground coffee blend without objectionably changing the taste characteristics of coffee brews prepared therefrom. The present invention satisfies these objects by the application to green Robusta coffee beans, of a special roasting step.

Roasting green coffee beans develops their flavor and supplies a brown color to them.

Conventionally, a blend of beans is roasted in a dry atmosphere by exposing the beans to air at a temperature ranging from about 500° F. to about 1,000° F. for a time period ranging from about 5 minutes to about 15 minutes. Typical roasting equipment and methods for roasting coffee beans are described, for example, in Sivetz & Foote, *Coffee Processing Technology*, Avi Publishing Company, Westport, Conn., 1963, Vol. 1, pp. 203-226.

It is also known to steam roast green coffee beans under pressure. Steam roasting methods are described in Hale et al., U.S. Pat. No. 2,712,501; in Topalian et al., U.S. Pat. No. 3,088,825; and in Spotholz, U.S. Pat. No. 3,106,470. These steam roasting methods are ordinarily utilized to produce roasted coffee having a high soluble solids content for use especially in instant coffee production.

Different types of green coffee beans are known to be either separately roasted or roasted as a blend. Usually the roasting process is applied to a blend. In separate roasting, the different types of green coffee beans are roasted apart from each other and the roasted beans are blended after roasting or grinding. Separate roasting processes are utilized to finely tune the flavor development of each type of coffee. Separate roasting is described in Sivetz & Foote, supra, p. 239.

However, the combination of separate roasting and steam roasting Robusta beans which is utilized in the present invention is not known to be taught by the prior art. Nor, are the particular steam roasting conditions which coact in the present invention to satisfactorily upgrade the flavor of Robusta beans known to be described in the prior art. In fact, no method is known to be taught in the prior art which upgrades the flavor of Robusta beans to the extent that increased levels of Robusta usage can be employed in roast and ground coffee products without deleterious taste change. On the other hand, this result is accomplished by the present invention.

SUMMARY OF THE INVENTION

It has been surprisingly discovered that green Robusta coffee beans can be roasted in a particular manner to produce a novel improved-flavor Robusta coffee. This roasting procedure noticeably attenuates the characteristic bitter, rubbery flavor notes normally attributable to Robusta coffee and makes dominant and/or develops delicate fruity (prunelike), acid (tingling), green apple (sweet-sour) notes.

Because of this flavor improvement in the specially processed Robusta coffee beans, substitution of Robusta beans for Arabica beans can be made in the formulation of blends of roast and ground coffee with greater latitude than that conventionally permitted without affecting the taste characteristics of the coffee brew prepared therefrom. In particular, increased amounts of Robusta beans can now be employed in a roast and ground coffee blend to provide matching taste or even an improved taste compared to where lesser amounts of Robusta beans are utilized.

Thus, the specially processed Robusta coffee of the present invention can be utilized to formulate a novel roast and ground coffee blend which is brewed to a smooth balanced flavor matching or superior to the flavor of a brew from a conventionally roasted coffee blend containing a lesser amount of Robusta.

The specially processed Robusta coffee of the present invention is flavor improved by a novel roasting process.

DETAILED DESCRIPTION OF THE INVENTION

The Novel Specially Processed Robusta Coffee

The novel specially processed Robusta coffee herein is separately steam roasted, postroasted Robusta coffee. The special processing is the novel roasting process of this invention; this process is described in more detail below. The novel Robusta coffee is characterized by the improved flavor described above. It can be in bean form suitable for grinding before use for brewing or it can be in ground form.

The Novel Roast and Ground Coffee and Blend

The novel roast and ground coffee product and blend of this invention comprises by weight (1) from about 5 percent to about 40 percent of the specially processed Robusta coffee in ground form and (2) from about 95 percent to about 60 percent of conventionally roasted Arabica coffee or of a conventionally roasted blend of Arabica and Robusta coffees, the conventionally roasted coffee being in ground form. The product contains no more than about 20 percent by weight of conventionally roasted Robusta coffee. Brews from the novel product possess a smooth balanced coffee flavor. The conventional roasting process referred to herein denotes the roasting method described above wherein green beans are roasted exclusively by exposure to dry heated air.

If the roast and ground coffee product and blend of this invention comprises less than the above lower limit of about 5 percent by weight of the specially processed Robusta coffee of this invention, the cost and flavor advantages of utilizing this specially processed Robusta coffee in a blend are minimized.

If the product comprises more than the above upper limit of about 40 percent by weight specially processed Robusta coffee, brew from the product can have an inferior coffee flavor. If the product contains more than the above maximum limit of about 20 percent by weight of conventionally roasted Robusta coffee, brews from the product can have the characteristic bitter rubbery taste normally associated with Robusta coffee.

Preferably, the roast and ground coffee product and blend of this invention comprises by weight (1) from about 15 percent to about 30 percent of specially processed Robusta coffee and (2) from about 85 percent to about 70 percent of conventionally roasted Arabica coffee or of a conventionally roasted blend of Arabica and Robusta coffees, the amount of conventionally roasted Robusta coffee in the product not exceeding about 15 percent by weight of the product.

The Novel Roasting Process

As previously indicated, the special processing to flavor improve and upgrade Robusta coffee beans to provide the novel Robusta coffee of this invention is a novel roasting process. This roasting process is a two-step roasting process. More particularly, this process comprises the steps of (1) separately steam roasting green Robusta coffee beans to provide partially roasted beans and then (2) postroasting the partially roasted beans to complete the roast. These steps are carried out at particular conditions described below which are essential for and coact to achieve the flavor improvement which is an object of this invention.

It is noted first of all that in the first step herein, that is in the steam roasting step, green Robusta coffee beans are separately roasted. This means that the Robusta beans are the only type of beans present when they are being steam roasted. In other words, they are not roasted as part of a blend. This separateness of the steam roasting is a key factor in the upgrading of the Robusta flavor so relatively high percentages of Robusta can be advantageously utilized in a roast and ground coffee product. Thus, if the Robusta is steam roasted as part of a blend rather than separately steam roasted as in the present invention, a significantly inferior coffee flavor can be developed in the roasted beans and in the ultimate blend compared to the flavor developed in the present invention. The significant advantage of the separate steam roasting in the process of this invention is shown in Example I below.

Thus, in the steam roasting step, green Robusta coffee beans exclusively are charged into a steam roasting zone.

The green beans charged to the steam roasting zone are preferably at room temperature, that is, at a temperature ranging from about 70° F. to about 100° F. and are characterized by a natural moisture content ranging from about 8 percent to about 14 percent. In other words, previous to their being subjected to steam in the steam roasting zone, the beans preferably are not subjected to a preheating step as described in Topalian et al., U.S. Pat. No. 3,088,825 or Spotholz, U.S. Pat. No. 3,106,470 where previous to steam roasting, beans are preheated by being exposed to heated gas. This is because such a preheating operation lowers the natural moisture content of the beans thereby requiring a greater increase in moisture level during steam roasting to achieve the moisture level described hereinafter as being essential for that operation. Moreover, higher temperature beans produced by such a preheating step do not cause the condensation of as much steam during the steam roasting operation as the colder beans preferred herein; as a result, if a preheating step is utilized, the moisture levels in the beans essential during the steam roasting operation herein are achieved with difficulty.

The charged green beans are further characterized by a color which is defined by a Hunter Color "L" scale value ranging from about 39 to about 42. The color of the unroasted beans is defined here to provide a standard of comparison with the color of the beans as roasting proceeds. The color change is important because it is related to the degree to which coffee beans have been roasted.

The Hunter Color "L" scale values utilized herein to define the color of coffee beans and the degree to which they have been roasted are units of color measurement in the Hunter Color system. That system is a well-known means of defining the color of a given material. A complete technical description of the system can be found in an article by R. S. Hunter, "Photoelectric Color Difference Meter," Journal of the Optical Society of America, Vol. 48, pp. 985–95, 1958. Devices specifically designed for the measurement of color on the Hunter Color scales are described in U.S. Pat. No. 3,003,388 to Hunter et al., issued Oct. 10, 1961. In general, it is noted that Hunter Color "L" scale values are units of light reflectance measurement, and the higher the value is, the lighter the color is since a lighter colored material reflects more light. In particular, in the Hunter Color system the "L" scale contains 100 equal units of division; absolute black is at the bottom of the scale (L=0) and absolute white is at the top (L=100). Thus, in measuring degrees of roast, the lower the "L" scale value the greater the degree of roast, since the greater the degree of roast is, the darker the color of the roasted bean is. The use of the Hunter Color "L" scale value provides an accurate and reproducible means for measurement of degree of roast. The Hunter Color "L" scale values herein are measured utilizing ground beans, the grind size being through 12-mesh U.S. Standard Sieve Series and more than 75 weight percent on 30-mesh U.S. Standard Sieve Series. With roasted beans, the level of moisture in the beans is adjusted to a level of below 7 weight percent if not already at that level, before color measurement. If the color of green beans is being measured, the moisture level is not adjusted before color measurement.

The steam roasting zone is a confining zone capable of being pressurized, of receiving the beans, and of receiving steam to roast the beans; it can be, for example, a pressure vessel. The charged beans ordinarily have a bulk volume occupying from about 50 percent to 100 percent of the volume of the steam roasting zone; the rest of the zone, if any, is head space. As used herein, the term "bulk volume" means the volume occupied by the beans together with the volume of the interstices in the mass of charged beans. The interstices in the mass of charged beans ordinarily have a volume of about one-third of the bulk volume of charged beans. The head space, if any, and the interstices are reserved for receiving the steam. The beans can be charged to the steam roasting zone, for example, by gravity feed from a hopper.

The steam roasting zone having been charged with green beans is then sealed from the atmosphere.

At this point, it is preferred that essentially all of the air remaining in the steam roasting zone be removed from it. This air-removal operation is desirable in order to achieve a uniform roast and to aid in the attainment of quality control and uniformity in the ultimate product. This air-removal operation can be conveniently carried out by evacuating the previously charged steam roasting zone to a pressure ranging from about 3 to about 6 absolute inches of Hg. The removal of a sufficient amount of air from the steam roasting zone is further assured by drawing a vacuum on the steam roasting zone for up to about 5 minutes, usually for about 30 seconds to about 1 minute, after the above pressures have been achieved, while supplying steam to the zone to displace and purge remaining air from it. The air-removal operation is discontinued by the discontinuance of the drawing of the vacuum.

After the air-removal operation has been completed; or if no air-removal operation is utilized, after the charged steam roasting zone has been sealed to the atmosphere, saturated steam is introduced into the steam roasting zone and the beans in this zone are exposed to this steam. The steam is introduced to obtain in the steam roasting zone a steam partial pressure, i.e., partial pressure due to steam, (usually equivalent to the total pressure in the steam roasting zone just after steam introduction has been completed) ranging from about 90 p.s.i.g. to about 200 p.s.i.g., a steam temperature ranging from about 330° F. to about 390° F. and a moisture content in the beans ranging from about 15 weight percent to about 35 weight percent. To obtain these conditions the weight of saturated steam introduced ordinarily ranges from about 15 percent to about 40 percent of the weight of the beans charged to the zone. The steam introduction is conveniently carried out over a time period ranging from about 1 minute to about 4 minutes; the about 1 minute lower limit is ordinarily required to physically carry out the introduction and the about 4 minutes upper limit is provided to minimize processing cycle times.

The above-described conditions of steam partial pressure, steam temperature and bean moisture content having been obtained in the steam roasting zone by the steam introduction are maintained in that zone to partially roast the beans. More particularly, these conditions are maintained for a time period ranging from about 2 minutes to about 12 minutes to roast the beans to a color having a Hunter Color "L" scale value ranging from about 22 to about 33. As previously indicated, the amount of moisture in the beans is reduced to a level of 3 to 7 weight percent, for example, by air drying before they are ground in the Hunter Color "L" scale value measurement procedure referenced hereinbefore.

In general, the lower the steam temperature and steam partial pressure which is utilized, the longer these conditions must be maintained in the steam roasting zone to achieve a particular color and degree of roast. The following table presents useful steam partial pressure and time relationship guidelines to achieve a particular color range. This table also takes into account the steam temperature in the steam roasting zone since this condition is related to the pressure.

TABLE 1

| Color (Hunter L Scale Value) | Partial Pressure Due to Steam (p.s.i.g.) | Roast Time (minutes) |
| --- | --- | --- |
| 29–33 | 90–115 | 7–10 |
| 29–33 | 115–135 | 4–7 |
| 29–33 | 135–160 | 2–4 |
| 25–29 | 90–115 | 10–12 |
| 25–29 | 115–135 | 7–10 |
| 25–29 | 135–160 | 4–7 |
| 25–29 | 160–185 | 2–4 |
| 22–25 | 115–135 | 10–12 |
| 22–25 | 135–160 | 5–10 |
| 22–25 | 160–200 | 2–5 |

If steam partial pressures less than the above-recited lower limit of about 90 p.s.i.g. are utilized or if steam temperatures less than the above-recited lower limit of about 330° F. are utilized, steam roasting times longer than about 12 minutes will be required to achieve a particular required bean roast color whereby capacity will be decreased. Moreover and more importantly, the pressure in the steam roasting zone will not be sufficiently high to convey the beans from the zone by the step described hereinafter, whereby extra handling will be necessitated.

If steam partial pressures exceeding the above-recited upper limit of about 200 p.s.i.g. are utilized or if steam temperatures exceeding the above-recited upper limit of about 390° F. are utilized, steam roasting times less than about 2 minutes will be required to achieve a particular required bean roast color if that color can be achieved at all. Short steam roasting times of less than about 2 minutes cannot be utilized herein because the use of such times results in a nonuniform roast from the standpoints of bean-to-bean color uniformity, inside-of-bean to-outside-of-bean color uniformity and batch-to-batch color uniformity, whereby quality control problems are caused.

Preferably, there are obtained and maintained in the steam roasting zone steam partial pressures ranging from about 135 p.s.i.g. to about 160 p.s.i.g. (with a steam partial pressure of about 150 p.s.i.g. being optimum), steam temperatures ranging from 358° F. to about 371° F., and bean moisture contents ranging from about 20 weight percent to about 32 weight percent. These conditions are preferably maintained for a time period ranging from about 2.5 minutes to about 6 minutes. Preferably, the beans are roasted to a color having a Hunter Color "L" scale value ranging from about 23 to about 31.5 measured on the beans after grinding and drying as previously indicated.

Once the desired steam temperature, steam partial pressure and bean moisture conditions have been obtained by the introduction of the steam, these conditions are maintained by discontinuing steam introduction and sealing up the steam roasting zone, for example, by closing a valve in the steam entry lines to the steam roasting apparatus. Once the steam roasting zone has been sealed up, the steam temperature in the zone remains essentially constant as does the steam partial pressure (both the steam temperature and steam partial pressure drop very slightly as steam condenses during the steam roasting); on the other hand, the total pressure in the zone progressively increases because exothermic flavor and other reactions occurring during the roasting produce gaseous reaction products. The amount of this pressure increase is generally less than about 40 p.s.i.g. The amount of pressure increase depends on the volume percentage of the zone charged with beans, with higher percentage fills generally resulting in the higher pressure increases.

After the steam partial pressure, steam temperature and bean moisture conditions have been maintained in the steam roasting zone for the proper period of time to partially roast the beans to the desired degree, the roasting is quickly terminated by the rapid release of the pressure which was built up in the steam roasting zone. The roasting is terminated because the pressure release is accompanied by the lowering of the temperature to which the beans are exposed and by the lowering of the level of the moisture in the beans. This quick roasting termination and the rapid release of pressure in the steam roasting zone causing this quick roasting termination are essential to assure roasting to the proper degree and control of color and flavor in the ultimate product.

This quick pressure release can be accomplished by rapidly opening the previously sealed steam roasting zone to the atmosphere. This can be done, for example, by quickly and completely opening a valve in a bean discharge line from the steam roasting apparatus. As a result the pressure to which the beans are exposed is quickly reduced to atmospheric pressure, the temperature in the beans is reduced to about 212° F. and steam escapes from the beans whereby the moisture level in the beans is reduced to a level ranging from about 10 to about 30 weight percent. Under these reduced levels of pressure, temperature and bean moisture content, roasting ceases and the color and flavor produced in the bean becomes firm subject to further processing. To assure achievement of these benefits, it is essential that the pressure be reduced from the level which was maintained to the level of atmospheric pressure in less than 60 seconds, preferably in less than 20 seconds.

This quick release of pressure is also important because it enables the achievement of the additional benefit that the steam escaping during the pressure release can be utilized to convey the beans from the steam roasting zone into an expansion zone and into a receiving or recovery zone. For example, if the pressure is quickly released by the above-described method of opening a valve in a bean discharge line extending from the steam roasting apparatus, steam escapes from the steam roasting apparatus (steam roasting zone) into the discharge line (an expansion zone) conveying the beans from the apparatus into the discharge line and from there into a recovery zone, for example, a receiving hopper.

The partially roasted beans ordinarily remain in the recovery zone for a time period not exceeding about 2 hours, preferably not exceeding about 1 hour. Often, there is a time lag of at least 15 minutes for the beans in the recovery zone because of scheduling problems and capacity differences between the batch steam roasting step described hereinbefore and the batch postroasting step described hereinafter.

The partially roasted beans are then treated in the postroasting step of the process of this invention. In this step, the moisture level in the beans is reduced and the final color and flavor of the beans are developed.

In this step, the partially roasted beans are charged, for example, from the recovery zone, to a postroasting zone for completion of the roast.

The beans charged to the postroasting zone have the color achieved in the steam roasting step. They are at a temperature ranging from about 100° F. to about 212° F. and have a moisture level ranging from about 10 weight percent to about 30 weight percent. Preferably they are at a temperature ranging from about 150° F. to about 212° F. and have a moisture level ranging from about 15 weight percent to about 25 weight percent.

The postroasting zone is a confining zone capable of receiving the beans and of receiving heated air for exposure to the beans at atmospheric pressure. It can be, for example, a conventional roaster comprising a rotatable drum to confine the beans and to vary the exposure of the bean surfaces, a source of heated air, and means for circulating the air in the drum whereby it contacts the beans to roast them.

In the postroasting zone, the partially roasted beans are exposed to air at a temperature ranging from about 375° F. to about 1,000° F. for a time period ranging from about 7.5 minutes to about 30 minutes. Preferably, the air temperature ranges from about 400° F. to about 600° F. and the roasting time ranges from about 8 minutes to about 15 minutes. The postroasting is carried out at atmospheric pressure. Generally, a temperature ranging from about 325° F. to about 500° F., preferably ranging from about 350° F. to about 420° F., is caused to occur at the surface of the beans by the end of the postroasting step.

The combination of the air temperature and time period are required to coact to reduce the moisture in the beans to a level ranging from about 2 weight percent to about 5 weight percent and to roast the beans to a final color having a Hunter Color "L" scale value ranging from about 18.5 to about 26. Preferably, the moisture in the beans is reduced to a level ranging from about 2.5 weight percent to about 4 weight percent and a final color having a Hunter Color "L" scale value ranging from about 19.5 to about 25 is achieved.

From about 40 percent to about 90 percent of the Hunter Color "L" scale value color change is caused to occur in the steam roasting step herein and the remainder of the color change is caused to occur in the postroasting step herein.

If, in the postroasting step, air temperatures exceeding the above upper limit of about 1,000° F. are utilized or if temperatures at the surface of the beans exceeding about 500° F. are caused to occur by the end of the postroasting step, some of the beans can burn and these burned beans have an adverse effect on flavor. If, on the other hand, air temperature less than the above lower limit of about 375° F. are utilized or if temperatures at the surface of the beans less than about 325° F. are not caused to occur by the end of the postroasting step, some of the beans will not be sufficiently roasted, or excessively long roasting times are required.

It is essential that postroasting times exceeding the above lower limit of about 7.5 minutes be utilized herein. This is because shorter times than this require air temperatures exceeding the above upper limit of about 1,000° F. to achieve a required bean color or to achieve the proper apportionment of roasting between the two roasting steps of the process of this invention. The disadvantage of utilizing an air temperature exceeding this limit of about 1,000° F. is stated above. There is an additional significant disadvantage here. Exceeding this upper air temperature limit during a short roasting period of less than about 7.5 minutes, while causing burning of the outside of the beans, does not result in sufficient roasting of the inside of the beans. This result is caused because the initial moisture in the beans is not sufficiently reduced in a short roasting time so that even roasting throughout the bean can be accomplished.

If postroasting times exceeding the above upper limit of about 30 minutes are employed, excessive drying and flavor deterioration of beans can occur or in any event the postroasting residence time can be so long as to adversely affect the capacity of the process.

In summary, the novel roasting process of this invention broadly comprises the steps of:

a. steam roasting by a process comprising the steps of (1) exclusively charging green Robusta coffee beans to a steam roasting zone; (2) exposing the beans to saturated steam to obtain in the zone a steam partial pressure ranging from about 90 p.s.i.g. to about 200 p.s.i.g. and a steam temperature ranging from about 330° F. to about 390° F. and a bean moisture content ranging from about 15 weight percent to about 35 weight percent; (3) maintaining the beans at these pressure, temperature and moisture conditions for a time period ranging from about 2 minutes to about 12 minutes to separately roast the beans to a Hunter Color "L" scale value ranging from about 22 to about 33; and (4) stopping the roast by quickly releasing the pressure, whereby the beans are conveyed from the steam roasting zone to a recovery zone; and b. postroasting the partially roasted beans resulting from the steam roasting step by a process comprising the steps of (1) charging the partially roasted beans to a postroasting zone; and (2) exposing the partially roasted beans in the postroasting zone to air at a temperature ranging from about 375° F. to about 1,000° F. for a time period ranging from about 7.5 minutes to about 30 minutes and achieving at the surface of the beans by the end of the postroasting period a temperature ranging from about 325° F. to about 500° F., to reduce the moisture in the beans to a level ranging from about 2 weight percent to about 5 weight percent and to roast the beans to a final color having a Hunter Color "L" scale value ranging from about 18.5 to about 26;

from about 40 percent to about 90 percent of the HUnter Color "L" scale value color change being caused to occur in the steam roasting step, and the remainder of the color change being caused to occur in the postroasting step.

A preferred roasting process of this invention comprises the steps of:

a. steam roasting by a process comprising the steps of (1) exclusively charging green Robusta coffee beans to a steam roasting zone; (2) removing essentially all the air from said steam roasting zone; (3) exposing the beans to saturated steam to obtain in the zone a steam partial pressure ranging from about 135 p.s.i.g. to about 160 p.s.i.g. and a steam temperature ranging from about 358° F. to about 371° F. and a bean moisture content ranging from about 20 weight percent to about 32 weight percent; (4) maintaining the beans at these pressure, temperature and moisture conditions for a time period ranging from about 2.5 minutes to about 6 minutes to separately roast the beans to a Hunter Color "L" scale value ranging from about 23 to about 31.5; and (5) stopping the roast by quickly releasing the pressure, whereby the beans are conveyed from the steam roasting zone to a recovery zone; and b. postroasting the partially roasted beans resulting from the steam roasting step by a process comprising the steps of (1) charging the partially roasted beans to a postroasting zone; and (2) exposing the partially roasted beans in the postroasting zone to air at a temperature ranging from about 400° F. to about 600° F. for a time period ranging from about 8 minutes to about 15 minutes and achieving at the surface of the beans by the end of the postroasting period a temperature ranging from about 350° F. to about 420° F., to reduce the moisture in the beans to a level ranging from about 2.5 weight percent to about 4 weight percent and to roast the beans to a final color having a Hunter Color "L" scale value ranging from about 19.5 to about 25;

from about 40 percent to about 90 percent of the Hunter Color "L" scale value color change being caused to occur in the steam roasting step, and the remainder of the color change being caused to occur in the postroasting step.

In addition to the above broad and preferred processes which were described previously herein, there are two very preferred processes of this invention which have not been described previously herein. One of these very preferred processes is utilized to produce a dark-colored roasted product. The other very preferred process is utilized to produce a lighter colored roasted product. These processes utilize the same conditions as the preferred process hereinbefore described except as otherwise stated hereinafter.

In the very preferred process for producing dark-colored roasted Robusta beans, the steam roasting and postroasting steps are carried out utilizing the conditions and obtaining the results listed in the following table:

Table 2

| | |
|---|---|
| Steam partial pressure maintained in the steam-roasting zone | 145 p.s.i.g. to 155 p.s.i.g. |
| Steam temperature maintained in the steam-roasting zone | 355° F. to 365° F. |
| Bean moisture maintained during steam-roasting | 20 weight percent to 32 weight percent |
| Time steam-roasting conditions are maintained | 2.5 minutes to 3 minutes |
| Hunter Color "L" scale value obtained by steam-roasting | 31 to 31.5 |
| Post-roasting air temperature | 450° F. to 550° F. |
| Post-roasting time | 9.65 minutes to 9.85 minutes |
| Final temperature at bean surface | 380° F. to 410° F. |
| Hunter Color L-scale value obtained by post-roasting | 20 to 21 |

The very preferred process for producing lighter colored roasted Robusta beans is the same as the process set forth in the above Table 2 except that during steam roasting the conditions in the steam roasting zone are maintained for a period ranging from about 4.75 minutes to about 5.25 minutes to obtain a Hunter Color "L" scale value ranging from about 26 to about 27 and except that during postroasting conditions in the postroasting zone are maintained for a time period ranging from about 8.25 minutes to about 8.75 minutes to obtain final temperature at the bean surface ranging from 345° F. to 375° F. and a final color having a Hunter Color "L" scale value ranging from about 23 to about 24.

Once the steam roasting and postroasting steps have been carried out, the postroasting is conveniently stopped by turning off the roaster flame and spraying tapwater on the beans followed by gravity conveying the beans from the postroaster to a convective cooling vessel. Preferably, the roasted beans are then cooled to a temperature ranging from about 60° F. to about 100° F. over a time period ranging from about 1 minute to about 15 minutes by convective air cooling.

The cooled roasted beans can be separately in any convenient grinding process and then admixed and blended with appropriate amounts of ground conventionally roasted Arabica or Arabica and Robusta to formulate and produce the novel roast and ground coffee product and blend of this invention described hereinbefore. Conventional roasting can be carried out, for example, as previously described; for example a 10 to 15 minute roasting time to achieve an end point temperature at the surface of beans ranging from about 390° F. to about 420° F. can be utilized. By end point temperature is meant the temperature achieved by the end of the roasting period and not exceeded before the end of the roasting period.

Suitable methods and apparatus for grinding roasted coffee beans are disclosed in Sivetz & Foote, supra, pp. 239–250. A suitable grind size can be, for example, 0 to 5 percent by weight on 12-mesh U.S. Standard Sieve Series and 5 to 20 percent by weight through 30-mesh U.S. Standard Sieve Series. Other suitable grind sizes are indicated in Sivetz & Foote, supra, pp. 239–250.

The roast and ground product can be packaged, for example, by conventional packaging methods in conventional containers.

Brew made from ground Robusta coffee specially processed by the novel roasting process of the present invention has the improved flavor hereinbefore described in that the characteristic bitter, rubbery flavor notes normally attributable to Robusta coffee are noticeably attenuated, and delicate fruity, acid, green-apple notes are recognizable.

Brew made from the roast and ground coffee product and blend of this invention which contains the specially processed Robusta coffee has a smooth balanced flavor and high flavor impact.

The following specific examples are illustrative of the present invention.

In these examples, the steam roasting apparatus which is utilized comprises a cylindrical vertically oriented, stainless steel pressure vessel. The vessel has a diameter of 1.5 feet, and height of 10 feet, and a volume of 19.7 cubic feet. Communicating with the top of the vessel is a valved feedline through which green beans are fed into the vessel. A valved discharge line for the discharge of partially roasted beans from the vessel communicates with the bottom of the vessel. A plurality of equally spaced vertically aligned apertures are positioned in the vessel sidewall. These apertures communicate with steam feedlines through which steam can be introduced into the vessel or with vacuum lines through which air can be removed from the vessel. A reticulated screen member is positioned over each of these apertures to prevent beans charged to the vessel from exiting from the vessel through the communicating lines. The feed and vacuum lines are valved so the vessel can be sealed. The discharge line communicates with a receiving hopper to receive partially roasted beans and to charge them to the postroasting apparatus.

The postroasting apparatus is a conventional roaster of the Thermalo type described in Sivetz & Foote, supra, at page 205. It has a volume of 50 cubic feet, 40–60 percent of which are ordinarily filled with coffee.

EXAMPLE I

Eight hundred pounds of green African Robusta coffee beans are fed into the above-described steam roaster. The beans are charged by gravity feed from a hopper via a feedline into the roaster. The beans are at a temperature of 75° F. They contain 10.5 weight percent moisture and have a color defined by a Hunter Color "L" scale value of 40.8. The charged beans have a bulk volume occupying 99 percent of the volume of the roaster; the head space and interstices between beans amount to 40 percent of the volume of the roaster.

After the roaster has been charged with beans, the valve on the bean feedline is closed sealing the roasting chamber to the atmosphere. Then a vacuum is drawn on the chamber through the vacuum lines for 30 seconds to reduce the pressure in the chamber to 5 absolute inches of Hg whereby essentially all air is removed from the chamber. When this pressure has been achieved, the drawing of the vacuum is continued for 30 seconds while saturated steam is fed into the chamber at the rate of 1,500 pounds per hour; this purges some of the remaining air from the chamber.

Then the vacuum lines are closed and the drawing of the vacuum is discontinued. The feeding of the steam is continued now at the rate of 5,000 pounds per hour. This steam feed rate is continued for 2 minutes to obtain in the steam roasting chamber a steam partial pressure of 150 p.s.i.g. (equivalent to the total pressure) and a steam temperature of 365° F. The amount of saturated steam introduced into the steam roasting chamber is 167 pounds or 21 percent of the weight of the beans charged. When the above pressure and temperature conditions have been obtained, the moisture level in the beans is 25 percent of their weight.

Valves in the steam entry lines are then closed so that the steam feed is discontinued and so that the steam roasting chamber is sealed up to maintain the pressure, temperature and bean moisture conditions in that chamber. The chamber is kept sealed up for 2.8 minutes. During this period, the steam temperature and the steam partial pressure in the roasting chamber remains essentially constant, and the total pressure in the chamber progressively increases to 185 p.s.i.g. Thus, the beans are exposed to the saturated steam, and the obtained conditions of steam partial pressure, steam temperature and bean moisture content are maintained for a 2.8 minute period. As a result, the beans are roasted to a color defined by a Hunter Color "L" scale value of 31.

The roast is then stopped by quickly reducing the pressure to which the beans are exposed to the level of atmospheric pressure. This is accomplished by the complete opening over a period of about 1 second of a valve in the bean discharge line which communicates with the steam roasting chamber at the bottom of the steam roaster and also with the atmosphere.

The steam escaping during the pressure release conveys the beans from the steam roasting chamber through the bean discharge line into a receiving hopper which is at atmospheric pressure. The discharge of the beans occurs over a period of approximately 10 seconds. The temperature in the beans quickly is reduced to approximately 212° F., and the moisture in the beans is reduced to a level of 20 percent by weight. The partially roasted beans remain in the receiving hopper for 45 minutes.

Then, 900 pounds of the wet partially roasted beans having cooled to approximately 212° F. and with a moisture level of 20 percent by weight are fed from the receiving hopper into the previously described postroaster. In the postroaster the beans are exposed to 525° F. air for a period of 9.75 minutes. The temperature measured at the surface of the beans at the conclusion of the 9.75 minute roasting period is 390° F. As a result of this postroasting the moisture in the beans is reduced to a level of 2.8 percent by weight and the beans are roasted to a final color defined by a Hunter Color "L" scale value of 20.5. Thus, 48.4 percent of the Hunter Color "L" scale value color change is caused to occur in the steam roasting step, and the remainder of the color change is caused to occur in the postroasting step. Quench water is then sprayed on the beans to increase the moisture level in the beans to 4.0 percent by weight.

The beans are then dumped from the postroaster into a convective air cooled and their temperature is reduced to 80° F. over a 10-minute period.

One pound of these separately steam roasted postroasted Robusta beans is then ground in a conventional grinder to a regular grind size of 2 percent by weight on No. 12 mesh, 26 percent by weight on No. 16 mesh, 43 percent by weight on No. 20 mesh, 16 percent by weight on No. 30 mesh and 13 percent by weight through No. 30 mesh, all U.S. Standard Sieve Series. Brew made from this ground coffee has an improved flavor in that the characteristic bitter, rubbery flavor notes normally associated with Robusta coffee are noticeably attenuated and delicate fruity, acid, green-apple notes are recognizable.

Twenty-two and one-half pounds of the remainder of the separately steam roasted, postroasted African Robusta beans are then admixed with 77.5 pounds of conventionally roasted Arabica beans. The Arabica beans consist of 40 pounds of Central American mild Arabica beans and 37.5 pounds of Brazilian and Ethiopian Arabica beans. The Arabica beans have been conventionally roasted in a Thermalo roaster over a 12-minute roasting period to achieve an end point temperature measured at the surface of the beans, of 400° F. The blend formed by this admixing is composed by weight of 22.5 percent of the separately steam roasted postroasted African Robusta coffee, 40 percent conventionally roasted Central American mild Arabica beans and 37.5 percent conventionally roasted Brazilian and Ethiopian Arabica beans (22.5 percent Robusta beans and a total of 77.5 percent Arabica beans). This blend is then ground in a conventional grinder to produce roast and ground coffee product having a grind size of 2 percent by weight on No. 12 mesh, 26 percent by weight on No 16 mesh, 43 percent by weight on No. 20 mesh, 16 percent by weight on No. 30 mesh and 13 percent by weight through No. 30 mesh, all U.S. Standard Sieve Series. Brew made from this product has a smooth balanced flavor. It has a flavor matching the flavor of a brew from a commercial product consisting of a conventionally roasted blend composed by weight of 15 percent African Robusta coffee, 50 percent Central American mild Arabica coffee and 35 percent Brazilian and Ethiopian Arabica coffee.

In another case, a blend of green beans is formulated to contain by weight 22.5 percent African Robusta beans, 40 percent Central American mild Arabica beans and 37.5 percent Brazilian and Ethiopian Arabica beans. This blend is steam roasted and postroasted under the same conditions as above, except that above, the Robusta beans are separately steam roasted and postroasted and the Arabica beans are conventionally roasted. This blend is conventionally ground. Brew made from this ground roasted blend has significantly less coffee flavor compared to brew made with the above product of this invention where the Robusta coffee was separately steam roasted and postroasted and the Arabica coffee was conventionally roasted. This shows the essentiality of the separate roasting to achieve the flavor improvement benefits of this invention.

EXAMPLE II

Eight hundred pounds of green African Robusta coffee beans having the same characteristics as the green African Robusta beans utilized in Example I are steam roasted and postroasted in the same manner as the green beans in Example I except for the following differences: In this example the steam roasting conditions are maintained for 5.0 minutes. At the end of this steam roasting period, the total pressure in the steam roasting chamber has increased to a level of 180 p.s.i.g. The beans are steam roasted to a color defined by a Hunter Color "L" scale value of 26.8. Before postroasting, the moisture in the beans reduces to a level of 21 percent by weight. The postroasting conditions are maintained for 8.5 minutes. At the conclusion of the postroasting, the beans have been dried to contain a moisture level of 3.8 percent by weight and have been roasted to a color defined by a Hunter Color "L" scale value of 23.8. Thus, 82.5 percent of the Hunter Color "L" scale value color change is caused to occur in the steam roasting step and the remainder of the color change is caused to occur in the postroasting step.

One pound of the separately steam roasted, postroasted Robusta coffee beans produced in this example are ground in a conventional grinder to a regular grind size of 2 percent by weight on No. 12 mesh, 26 percent by weight on No. 16 mesh, 43 percent by weight on No. 20 mesh, 16 percent by weight on No. 30 mesh and 13 percent by weight through No. 30 mesh, all U.S. Standard Sieve Series. Brew made from this ground coffee has an improved flavor in that the characteristic bitter, rubbery flavor notes normally associated with Robusta coffee are noticeably attenuated and fruity, acid, green-apple notes are recognizable.

Twenty pounds of the remainder of the separately steam roasted, postroasted Robusta beans are then admixed with 80 pounds of a conventionally roasted blend of Arabica and Robusta beans. The conventionally roasted blend consists of 68 pounds of Arabica beans and 12 pounds of Robusta beans. The Arabica beans consist of 40 pounds of Central American mild Arabica beans and 28 pounds of Brazilian and Ethiopian Arabica beans. The Robusta beans in the conventionally roasted blend are all African Robusta beans. The conventional roasting is carried out in a Thermalo roaster over a 12-minute roasting period to achieve a temperature measured at the surface of the beans at the end of the roasting period (end point temperature) of 400° F.

The blend formed by the admixture of the separately steam roasted, postroasted Robusta beans with the conventionally roasted blend of Arabica and Robusta beans is then ground in a conventional grinder to produce roast and ground coffee product having a grind size of 2 percent by weight on No. 12 mesh, 26 percent by weight on No. 16 mesh, 43 percent by weight on No. 20 mesh, 16 percent by weight on No. 30 mesh and 13 percent by weight through No. 30 mesh, all U.S. Standard Sieve Series. This product is composed of 20 percent by weight separately steam roasted postroasted Robusta coffee and 80 percent by weight of a conventionally roasted blend of Robusta and Arabica coffees. More particularly, this product is composed of 20 percent by weight separately steam roasted postroasted Robusta coffee, 68 percent by weight conventionally roasted Arabica coffee, and 12 percent by weight conventionally roasted Robusta coffee.

Brew from this product has a smooth balanced flavor.

In samples of 80 consumers and 250 consumers, brew from this product is found to have a flavor preferred to the flavor of a brew from a commercial product consisting of a conventionally roasted blend composed by weight of 15 percent African Robusta coffee, 50 percent Central American mild Arabica coffee and 40 percent Brazilian and Ethiopian Arabica coffee. In another sample of 500 consumers, brew from the product of this example is found to have a flavor matching that of brew from the commercial product.

What is claimed is:

1. A process for producing an improved Robusta-containing coffee blend, said process comprising the steps of:
    A. steam roasting by a process comprising steps of:
        1. exclusively charging green Robusta coffee beans having a temperature ranging from about 70° F. to about 100° F., a moisture content ranging from about 8 percent to about 14 percent by weight and color which is defined by Hunter Color "L" scale value ranging from about 39 to about 42 to a steam roasting zone;
        2. removing essentially all air from the steam roasting zone;
        3. exposing the beans to saturated steam to obtain in the zone a steam partial pressure ranging from about 135 p.s.i.g. to about 160 p.s.i.g. and a steam temperature ranging from about 358° F. to about 371° F. and a bean moisture content ranging from about 20 weight percent to about 32 weight percent;
        4. maintaining the beans at these pressures, temperature and moisture conditions for a time period ranging from about 2.5 minutes to about 6 minutes to partially roast the beans to a Hunter Color "L" scale value ranging from about 23 to about 31.5;
        5. stopping the roast by quickly releasing the pressure;
        6. conveying the partially roasted beans to a recovery zone; and
        7. storing the partially roasted beans in the recovery zone for a time period not exceeding about 2 hours;
    B. postroasting the partially roasted beans resulting from the steam roasting step by a process comprising the steps of:
        1. charging the partially roasted beans having a temperature ranging from about 100° F. to about 212° F. and a moisture level ranging from about 10 weight percent to about 30 weight percent to a postroasting zone; and
        2. exposing the partially roasted beans in the postroasting zone to air at a temperature ranging from about 375° F. to about 1,000° F. for a time period ranging from about 7.5 minutes to about 30 minutes and achieving at the surface of the beans by the end of the postroasting period a temperature ranging from about 325° F. to about 500° F., to reduce the moisture in the beans to a level ranging from about 2 weight percent to about 5 weight percent and to roast the beans to a final color having a Hunter Color "L" scale value ranging from about 18.5 to about 26;
        from about 40 percent to about 90 percent of the Hunter Color "L" scale value color change being caused to occur in the steam roasting step (A), and the remainder of the color change being caused to occur in the postroasting step (B);
    C. roasting Arabica coffee or a blend of Arabica and Robusta coffees at about 500° F. to about 1,000° F. for from 5 minutes to 15 minutes; and
    D. blending the roasted coffees of steps (B) and (C) to produce a coffee product comprising by weight from about 5 percent to about 40 percent of the coffee of step (B) and from about 95 percent to about 60 percent of the coffee of step (C) wherein the coffee blend contains no more than about 26 percent by weight of Robusta coffee roasted by the process of step (C).

2. The process of claim 1 wherein the green beans charged to the steam roasting zone have a bulk volume occupying from about 50 percent to 100 percent of the volume of the steam roasting zone, the rest of the zone, if any, being head space.

3. The process of claim 2 wherein the air removal is carried out by evacuating the previously charged steam roasting zone to a pressure ranging from about 3 to about 6 absolute inches of Hg.

4. The process of claim 3 wherein the removal of a sufficient amount of air from the steam roasting zone previous to roasting is further assured by drawing a vacuum on the steam roasting zone for up to about 5 minutes while supplying steam to the zone to displace and purge remaining air from it.

5. The process of claim 4 wherein the rapid pressure release to terminate the steam roasting is accomplished by rapidly opening the previously sealed steam roasting zone to the atmosphere so that the pressure to which the beans are exposed is quickly reduced to atmospheric pressure, the temperature in the beans is reduced rapidly to about 212° F. and steam escapes from the beans whereby the moisture level in the beans is reduced to a level ranging from about 10 weight percent to about 30 weight percent.

6. The process of claim 5 wherein the partially roasted beans charged to the postroasting zone are at a temperature ranging from about 150° F. to about 212° F. and have a moisture level ranging from about 15 weight percent to about 25 weight percent.

7. The process of claim 6 wherein the postroasting zone, the air temperature ranges from about 400° F. to about 600° F. and the postroasting time ranges from about 8 minutes to about 15 minutes and the air temperature and time period coact to reduce the moisture in the beans to a level ranging from about 2.5 weight percent to about 4 weight percent and to roast the beans to a final color defined by a Hunter Color "L" scale value ranging from about 19.5 to about 25.

8. The process of claim 7 wherein the coffee blend contains a total Robusta coffee content of greater than 20 percent by weight.

9. A process for producing an improved Robusta-containing coffee blend, said process comprising the steps of:
    A. steam roasting by a process comprising steps of:
        1. exclusively charging green Robusta coffee beans having a temperature ranging from about 70° F. to about 100° F., a moisture content ranging from about 8 percent to about 14 percent by weight and color which is defined by Hunter Color "L" scale value ranging from about 39 to about 42 to a steam roasting zone;
        2. removing essentially all air from the steam roasting zone;
        3. exposing the beans to saturated steam to obtain in the zone a steam partial pressure ranging from about 145 p.s.i.g. to 155 p.s.i.g. and a steam temperature ranging from about 355° F. to 365° F. and a bean moisture content ranging from about 20 weight percent to about 32 weight percent;
        4. maintaining the beans at these pressures, temperature and moisture conditions for a time period ranging from about 2.5 minutes to about 3 minutes to partially roast the beans to a Hunter Color "L" scale value ranging from about 31 to about 31.5;
5. stopping the roast by quickly releasing the pressure;
6. conveying the partially roasted beans to a recovery zone; and
7. storing the partially roasted beans in the recovery zone for a time period not exceeding about 2 hours;

B. postroasting the partially roasted beans resulting from the steam roasting step by a process comprising the steps of:
1. charging the partially roasted beans having a temperature ranging from about 100° F. to about 212° F. and a moisture level ranging from about 10 weight percent to about 30 weight percent to a postroasting zone; and
2. exposing the partially roasted beans in the postroasting zone to air at a temperature ranging from about 450° F. to about 550° F. for a time period ranging from about 9.65 minutes to about 9.85 minutes and achieving at the surface of the beans by the end of the postroasting period a temperature ranging from about 380° F. to about 410° F. to reduce the moisture in the beans to a level ranging from about 2 weight percent to about 5 weight percent and to roast the beans to a final color having a Hunter Color "L" scale value ranging from about 20 to about 21;

from about 40 percent to about 90 percent of the Hunter Color "L" scale value color change being caused to occur in the steam roasting step (A), and the remainder of the color change being caused to occur in the postroasting step (B);

C. Roasting Arabica coffee or a blend of Arabica and Robusta coffees at about 500° F. to about 1,000° F. for from 5 minutes to 15 minutes, and D. blending the roasted coffees of steps (B) and (C) to produce a coffee product comprising by weight from about 5 percent to about 40 percent of the coffee of step (B) and from about 95 percent to about 60 percent of the coffee of step (C) wherein the coffee blend contains no more than about 20 percent by weight of Robusta coffee roasted by the process of step (C).

10. A process for producing an improved Robusta-containing coffee blend, said process comprising the steps of:
A. steam roasting by a process comprising steps of:
1. exclusively charging green Robusta coffee beans having a temperature ranging from about 70° F. to about 100° F., a moisture content ranging from about 8 percent to about 14 percent by weight and color which is defined by Hunter Color "L" scale value ranging from about 39 to about 42 to a steam roasting zone;
2. removing essentially all air from the steam roasting zone;
3. exposing the beans to saturated steam to obtain in the zone a steam partial pressure ranging from about 145 p.s.i.g. to about 155 p.s.i.g. and a steam temperature ranging from about 355° F. to about 365° F. and a bean moisture content ranging from about 20 weight percent to about 32 weight percent;
4. maintaining the beans at these pressures, temperature and moisture conditions for a time period ranging from about 4.75 minutes to about 5.25 minutes to partially roast the beans to a Hunter Color "L" scale value ranging from about 26 to about 27;
5. stopping the roast by quickly releasing the pressure;
6. conveying the partially roasted beans to a recovery zone; and
7. storing the partially roasted beans in the recovery zone for a time period not exceeding about 2 hours;

B. postroasting the partially roasted beans resulting from the steam roasting step by a process comprising the steps of:
1. charging the partially roasted beans having a temperature ranging from about 100° F. to about 212° F. and a moisture level ranging from about 10 weight percent to about 30 weight percent to a postroasting zone; and
2. exposing the partially roasted beans in the postroasting zone to air at a temperature ranging from about 450° F. to about 550° F. for a time period ranging from about 8.25 minutes to about 8.75 minutes and achieving at the surface of the beans by the end of the postroasting period a temperature ranging from about 345° F. to about 375° F., to reduce the moisture in the beans to a level ranging from about 2 weight percent to about 5 weight percent and to roast the beans to a final color having a Hunter Color "L" scale value ranging from about 23 to about 24;

from about 40 percent to about 90 percent of the hunter color "L" scale value color change being caused to occur in the steam roasting step (A), and the remainder of the color change being caused to occur in the postroasting step (B);

C. roasting Arabica coffee or a blend of Arabica and Robusta coffees at about 500° F. to about 1,000° F. for from 5 minutes to 15 minutes; and D. blending the roasted coffees of steps (B) and (C) to produce a coffee product comprising by weight from about 5 percent to about 40 percent of the coffee of step (B) and from about 95 percent to about 60 percent of the coffee of step (C) wherein the coffee blend contains no more than about 28 percent by weight of Robusta coffee roasted by the process of step (C).

* * * * *

PO-1050
(5/69)

UNITED STATES PATENT OFFICE
CERTIFICATE OF CORRECTION

Patent No. 3,640,726          Dated February 8, 1972

Inventor(s) Gregory L. Bolt, Charles H. Brandt, Aubrey R. McLain, and Jayantilal M. Patel It is certified that error appears in the above-identified patent and that said Letters Patent are hereby corrected as shown below:

Column 8, line 38, "HUnter" should read -- Hunter --.

Column 9, line 62, after "separately" insert -- ground --.

Column 10, line 55, "99 percent" should read -- 90 percent --.

Column 16, line 48, "28 percent" should read -- 20 percent --.

Signed and sealed this 8th day of August 1972.

(SEAL)
Attest:

EDWARD M. FLETCHER, JR.        ROBERT GOTTSCHALK
Attesting Officer               Commissioner of Patents